US010422847B2

(12) United States Patent
Robinson et al.

(10) Patent No.: US 10,422,847 B2
(45) Date of Patent: Sep. 24, 2019

(54) INTERFEROMETRIC TIME DELAY OF ARRIVAL

(71) Applicant: Raytheon Company, Waltham, MA (US)

(72) Inventors: Ian S. Robinson, Redondo Beach, CA (US); Bradley A. Flanders, Whittier, CA (US); Daniel Kilfoyle, Falmouth, MA (US)

(73) Assignee: Raytheon Company, Waltham, MA (US)

( * ) Notice: Subject to any disclaimer, the term of this patent is extended or adjusted under 35 U.S.C. 154(b) by 330 days.

(21) Appl. No.: 15/492,694

(22) Filed: Apr. 20, 2017

(65) Prior Publication Data

US 2018/0306887 A1    Oct. 25, 2018

(51) Int. Cl.
*G01S 3/46*   (2006.01)
*G01S 3/48*   (2006.01)
*G01S 3/50*   (2006.01)

(52) U.S. Cl.
CPC ................... *G01S 3/48* (2013.01);
*G01S 3/46* (2013.01); *G01S 3/465* (2013.01);
*G01S 3/50* (2013.01)

(58) Field of Classification Search
CPC ... G01S 3/46; G01S 3/465; G01S 3/48; G01S 3/043; G01S 3/023; G01S 5/06
USPC ....................................................... 342/442
See application file for complete search history.

(56) References Cited

U.S. PATENT DOCUMENTS

| 5,724,047 A | 3/1998 | Lioio et al. |
| 2006/0087475 A1* | 4/2006 | Struckman ................ G01S 5/04 342/451 |
| 2010/0007555 A1* | 1/2010 | Ezal ...................... G01C 21/005 342/357.3 |
| 2011/0208481 A1 | 8/2011 | Slastion |
| 2018/0172794 A1* | 6/2018 | Rossman .................. G01S 3/04 |

FOREIGN PATENT DOCUMENTS

WO    2014149092 A2    9/2014

OTHER PUBLICATIONS

International Search Report and Written Opinion from related PCT Application No. PCT/US2017/064990 dated Mar. 21, 2018.

* cited by examiner

*Primary Examiner* — Harry K Liu
(74) *Attorney, Agent, or Firm* — Burns & Levinson, LLP; Joseph M. Maraia

(57) ABSTRACT

Systems and methods for determining an angle of arrival (AoA) of a signal received from an emitters at a pair of antennas spaced apart by more than one half wavelength of the received signal. Features of the signal are determined, including a phase difference between signal components detected at the antennas, and a time difference of arrival (TDOA) having a known measurement error. A set of TDOA possibilities bounded by the known TDOA measurement error and a set of AoA estimates using phase interferometry (PI) within the range are calculated. The TDOA set is iteratively reduced to determine a precise AoA estimate for the emitter.

21 Claims, 8 Drawing Sheets

INTERFEROMETRIC TIME DELAY OF ARRIVAL

BACKGROUND

1. Technical Field

This application relates to direction finding methods and systems employing phase and time difference measurements of radiofrequency (RF) signals received through two antenna elements spaced more than one-half wavelength apart, and more particularly to combining time and phase difference measurements to eliminate ambiguities in the geometric angle of arrival (AoA) caused by the periodic nature of the phase difference of signals received at the widely spaced antennas.

2. Discussion of Related Art

Electronic Support (ES) and Radar Warning Receiver (RWR) systems have an increasing need to precisely find Angles of Arrival (AoA) of RF emitters, including frequency agile emitters, as rapidly as possible (e.g. using small numbers of pulses received from said emitters.) Precise direction finding is also important in supporting jamming and other tactical applications. For pairs of antennas spaced many wavelengths apart, phase interferometry is capable of highly precise AoA measurements with less than 1° error, but multiple ambiguous angles of arrival are computed, caused by the periodic nature of the phase difference related to the geometric angle. Antennas spaced less than one-half wavelength apart have less precise AoA measurements. Many ES and RWR systems use a single antenna and receiver to cover a broad spectrum (e.g. 2-18 GHz), so antenna spacings at one-half of the largest wavelength may represent many multiples of the smallest wavelength. Further, many platforms are already outfitted with antennas spaced many wavelengths apart (to provide coverage at all azimuths about the platform). Thus, it is impossible to achieve unambiguous high precision AoA measurements and wide frequency coverage using a single baseline (two-element) interferometer.

Time Difference of Arrival (TDOA) direction finding may be used to compute AoA over a span of 180° without ambiguity. The time delay between two antennas is monotonic with respect to geometric angle changing from 0 to 90 degree (and conversely from −90 to 0), but TDOA provides relatively low AoA precision. Amplitude comparison direction finding generally provides a similarly coarse AoA precision. Improved AoA precision may be achievable using Frequency Difference of Arrival (FDOA) techniques, however FDOA requires stable emitter signal frequencies for long periods of time (e.g. 10ths of seconds, seconds, or many seconds depending on platform velocity and desired AoA precision, thus limiting the number of threats that can be simultaneously geolocated and limiting applicability to threats with a constant frequency. In comparison, an interferometer can provide precision AoA in a single pulse time (e.g., microseconds to milliseconds.)

U.S. Pat. No. 5,724,047 issued on Mar. 3, 1998 to Lioio teaches a precise direction finding system making use of single pulses and TDOA and phase interferometry (PI). The method disclosed therein was directed to low frequencies (large wavelengths), and operates on an assumption that the correct PI AoA solution is the one closest to (the single, coarse) TDOA AoA. However, for antenna spacing of greater than 1.5 times the received wavelength, where three or more ambiguities exist, the AoA solution provided by that technique is more likely to be incorrect than correct. Moreover, that technique does not address the use of multiple pulses, or contemplate frequency agile emitters.

Thus, systems and methods of precise direction finding without the aforementioned drawbacks would be beneficial. For example, a precise direction finding is desired that can quickly find AoA solutions for pulses received from emitters, including frequency agile emitters, across a broad range of frequencies. It would also be desirable to reduce and identify the possible errors associated with any ambiguous AoA solutions generated. Further, it would be additionally desirable to provide such improved direction finding capabilities to antenna systems already existing on many types of aircraft.

SUMMARY

Precision direction finding systems and methods are described for determining precise estimates of angles of arrival (AoA) of one or more RF signals (e.g., signal pulses) relative to a system antenna array upon which the signal(s) are incident. In one embodiment, pairs of antenna elements (e.g. the antennas deployed on many aircraft) are employed for improved, unambiguous (or predefined ambiguity error) highly accurate AoA measurements.

In one embodiment, a method is provided for determining a precise AoA of one or more components of a signal that are received at an antenna pair from an emitter, such as a frequency agile and/or non-agile emitter. A signal processor receives first and second components of the incident signal detected at corresponding pair of first and second widely (i.e., greater than $\lambda/2$ of the incident signal) separated antenna elements. These initial first and second signal components result from the same signal emission event from the emitter, but are received with different phases and at different times due the physical spacing of the antenna array elements. One or more features of the signal (and components) may then be determined, including, optionally, a frequency of the signal, a phase difference $\Delta\varphi$ between corresponding phases of the first and second signal components, and a time difference of arrival (TDOA) between the signal components, the TDOA having a known measurement uncertainty or error range (estimate). These signal component features may be fed from each antenna element to the processor, which performs a TDOA angle calculation using the TDOA to obtain a an AoA, where the calculation provides a single AoA estimate that is bounded by the known TDOA AoA measurement error range (the AoA is correct within the instrumentation's standard deviation.) The AoA error range width is a continuum of angles determined by an AoA estimate error calculation dependent on antenna element spacing, and a time of arrival measurement uncertainty or error range. The processor may then calculate a set of AoA estimates (or "ambiguities") using phase interferometry (PI) based on the determined first and second signal component phase difference and the frequency. Those outside the range of TDOA AoA possibilities may be ignored. The signal processor may then determine an 'actual' or precise AoA solution by, for one or more additional signals, iteratively performing similar steps of receiving subsequent signal components at the same frequency (e.g. from subsequent incident emitter signals, pulses, etc.) at the first and second antenna elements, determining the received signal components' features, averaging the previous and new TDOA measurements, then using the averaged TDOA measurements to re-compute the range of TDOA AoA possibilities with smaller AoA error range bounds, and, optionally, averaging the signal component phase differences and recalculating the PI AoA estimate for one or more additional signals associated with the emitter. As the AoA error range bounds from multiple TDOA measurements shrink, the number of possible solutions from the phase interferometry are reduced correspondingly, until only one AoA from PI remains in the AoA uncertainty range. The additional signal(s) may be collected for 10s to 1000s of microseconds. The processor may then select one or more AoA ambiguities from the set of discrete PI AoA ambiguities having a sufficiently high probability of representing the precise AoA for the signal(s) and emitter.

In the event that only one PI AoA estimate falls within the range of TDOA AoA possibilities, that PI AoA estimate may be returned by the signal processor as the precise AoA solution. The processor may alternatively report as the precise AoA solution the set of PI AoA estimates remaining within the range of TDOA AoA possibilities (also referred to herein as a TDOA "error boundary".) The processor may also calculate and report with each PI AoA estimate reported out a probability weight that the PI AoA estimate is the actual AoA for the RF signal and emitter.

In another embodiment, the signal processor may determine whether the frequency of the one or more additional signals associated with the emitter differs from the frequency of the first signal. If the frequency of the one or more subsequent signals differs from the frequency of the first signal, then initially there will be several AoAs computed for the first signal within the TDOA uncertainty range and a second different set of AoAs resulting from the subsequent signal. One, and in rare cases more than one, of these AoAs will be common while the others are not common. The true AoA solution is the one that is common. Additional instances of signals from the emitter may be collected to further verify the correct AoA. That single AoA estimate may then be reported by the signal processor as the precise AoA solution for the (frequency agile) emitter. If more than one PI AoA ambiguity is in common after a frequency change, all common angles will be reported and additional pulses at new frequencies will be received and their AoAs will be compared to prior results, until only one AoA is common to the ensemble of measured pulses. If, however, the frequency of the one or more additional signals remains constant as compared to the frequency of the first received signal, the signal processor averages the TDOA measurements computed during the additional iterations for the additional N signals with that of the first signal in order to reduce the range of TDOA AoA possibilities (as described and illustrated below), and disassociates any discrete PI AoA ambiguities no longer falling within the narrowed error boundary (i.e., the narrower error bounding the recomputed TDOA AoA estimate), until the set of discrete PI AoA ambiguities has been reduced to a point where the remaining PI AoA estimates each has a probability of being the correct AoA (e.g., in comparison to a predetermined probability threshold, etc.) solution for the signals and RF emitter. The signal processor then may report the contents of the reduced set of PI AoA ambiguities as the precise AoA solution.

In another embodiment, prior to averaging the TDOAs, the signal processor may narrow the initial range of TDOA AoA possibilities at each range boundary to the nearest discrete PI AoA ambiguity within the error boundary.

In yet another embodiment, if the frequency of the additional received signal(s) does not differ from the frequency of the first signal, the signal processor may monitor the TDOA measurement error and angular spacing of the discrete PI AoA (modulo $2\pi$) ambiguities in order to determine when a sufficient number of additional signals have been collected to achieve an AoA solution (or set of AoA estimates) having the predetermined probability threshold. If the signals comprise pulse signals, a pulse repetition interval may be calculated between the first pulse signal and the one or more additional pulse signals, and may be reported out with the error associated with the range of TDOA AoA possibilities (i.e., the width of the error boundary).

In another embodiment, the signal processor may utilize amplitude comparison direction finding techniques in addition to TDOA in order to initially compute, and then iteratively narrow (for non-agile emitters), the range of TDOA AoA possibilities. In this implementation, the first and second antenna elements might comprise directional antennas having known gain patterns and that are configured to point in distinct directions. The signal processor may adjust the range of TDOA AoA possibilities based on the amplitude comparison calculation using each set of received signal components.

In another embodiment, precise direction finding systems are provided including an antenna array comprising any two spaced apart antenna array elements and one or more signal processors for determining highly accurate AoA estimates for one or more RF signals. The systems may implement any of the methods described above. The signal processor(s) might include angle calculation means responsive to the phase difference and frequency values for performing a PI determination of the set of ambiguous PI estimates of the AoA. The angle calculation means may further perform the TDOA angle calculation to provide a coarse estimate(s) of the AoA, and select the precise estimate(s) of the AoA per the techniques described above.

Such systems may comprise an integral component of, or provide AoA information to, Electronic Support (ES) and/or Radar Warning Receiver (RWR) systems (e.g., in the form of pulse descriptor words and/or emitter descriptor words.) As shown in FIG. 1, the direction finding system may comprise a software or firmware retrofit to upgrade legacy ES or RWR systems using existing antenna elements 10a-10d configured at widely spaced stations, for example, on wings 12, nose 14 and/or tail 16 of an aircraft 18. These positions may allow the simplest physical installation, provide the best unobstructed field of view around the platform.

These and other features and advantages of the systems and methods will be apparent from this disclosure. It is to be understood that the summary, drawings, and detailed description are not restrictive of the scope of the inventive concept described herein.

BRIEF DESCRIPTION OF THE DRAWING

In the illustrations of the accompanying figures, like components may be given the same reference characters, regardless of whether they are shown in different examples. The illustrations of various elements are not necessarily to scale, emphasis instead being placed upon illustrating the principles of the examples. Various views are provided, wherein.

DETAILED DESCRIPTION

In the following description, numerous specific details are set forth. In the other instances, details well known to those skilled in the art may not be set out so as not to obscure the disclosed embodiments. It will be apparent to those skilled in the art in the view of this disclosure that modifications, substitutions and/or changes may be made without departing from the scope and spirit of the embodiments. The RF signals that are described in the following exemplary embodiments may be referred to as pulsed signals; however this is by no means intended to limit the scope of the disclosure to such signals. As used herein, the term signal may refer to a pulsed or continuously transmitted waveform originating at an emitter. In the case that the emitter emits pulsed signals, some or all of a pulse may be received and processed. In the case of a continuous wave signal, the signal may be received for an initial and subsequent intervals.

In accordance with the disclosed embodiments, phase interferometric (PI) and time difference of arrival (TDOA) techniques are combined to find precise emitter angle of arrival (AoA) solutions. PI techniques may generate multiple potentially correct AoA solutions (e.g., up to hundreds of modulo $2\pi$ ambiguities, or estimates, as the terms are used interchangeably herein.) The combination of multiple instances of PI and TDOA techniques allows unambiguous precision angle measurements to be made for receivers spanning more than two octaves of frequency with a single pair of spaced apart antenna elements (i.e., having a spacing of at least $\lambda/2$ and up to 1000s of wavelengths of the received RF signals) and suitable processing for a large number of emitters, including frequency agile emitters (FAEs). If frequency change is detected between successive signals associated with the same FAE, the PI estimates for the number of possible AOA solutions (or "ambiguities") may be reduced instantly, perhaps even to a singular precise AoA solution through comparative techniques. If the frequency remains constant between successive pulses or periods of signal reception associated with an emitter, TDOA results averaged over multiple pulses or periods may be employed to reduce a range of TDOA AoA possibilities within which the correct PI AoA estimate must fall, thereby reducing the number of PI AoA ambiguities to an acceptable (e.g., singular or small set) precise AoA solution.

Figure 1:
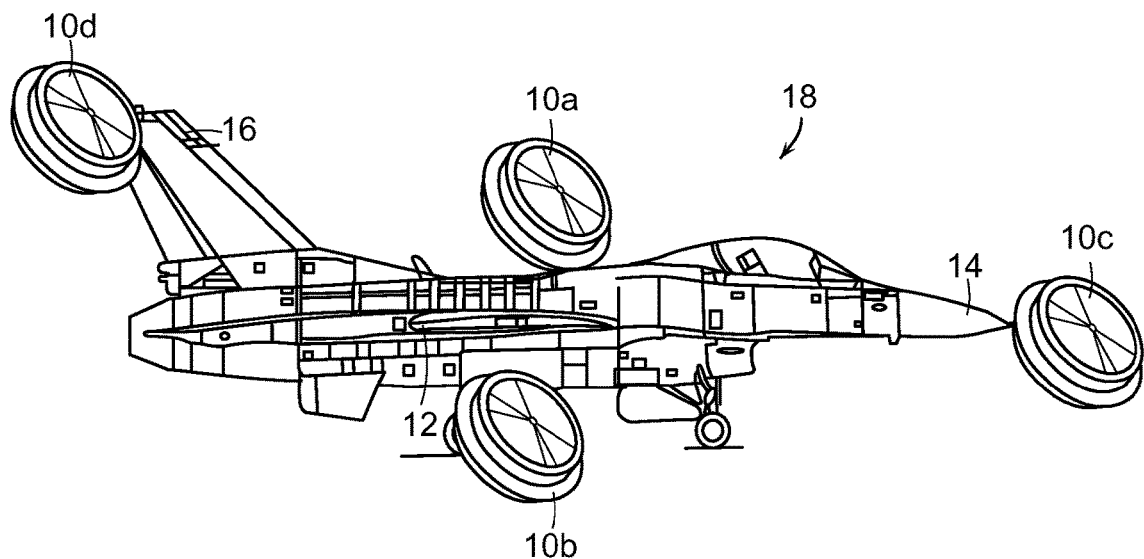
FIG. 1 is an illustration of an exemplary aircraft configured with multiple antenna elements for receiving emitter RF signals.
Figure 2:
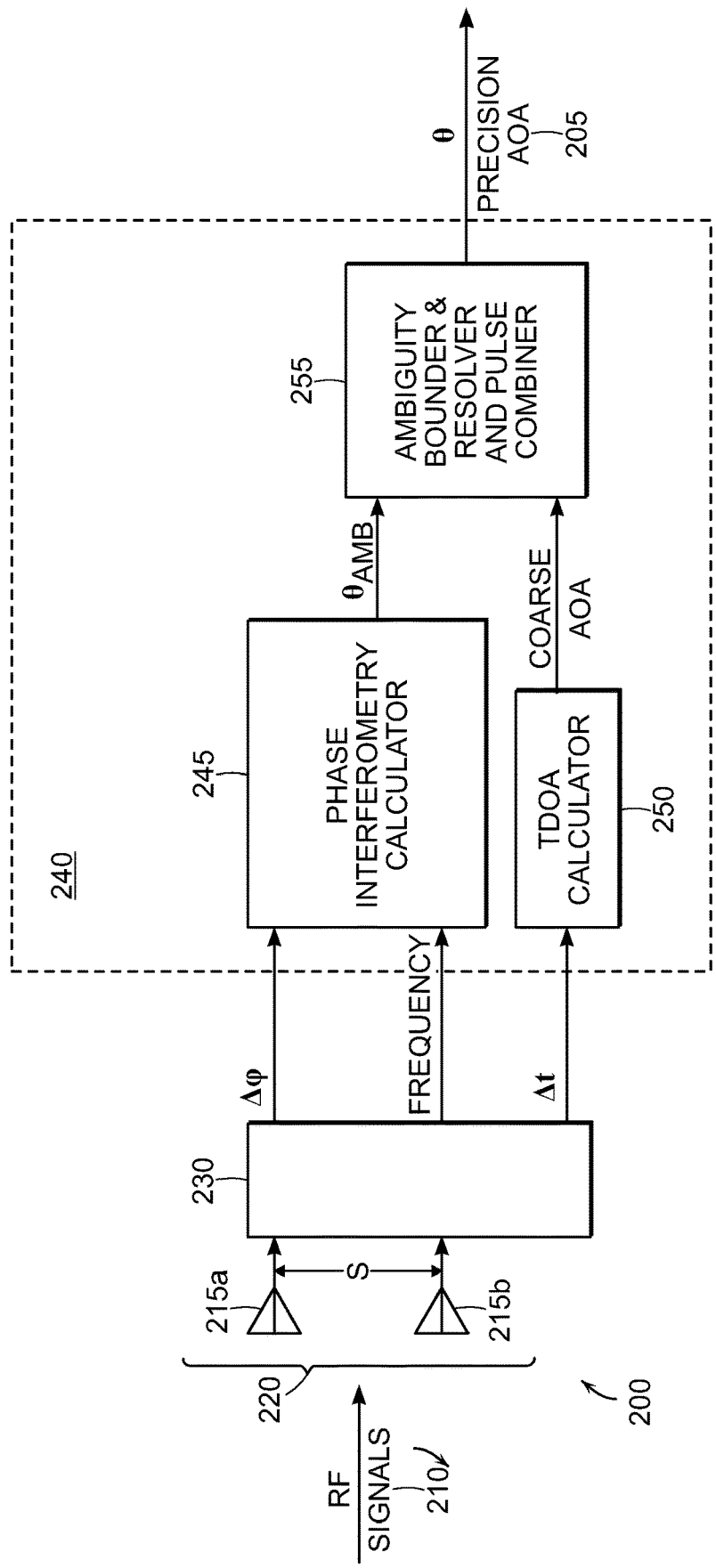
FIG. 2 is functional block diagram of an exemplary system for improved angle of arrival direction finding in accordance with an embodiment.
Figure 3:
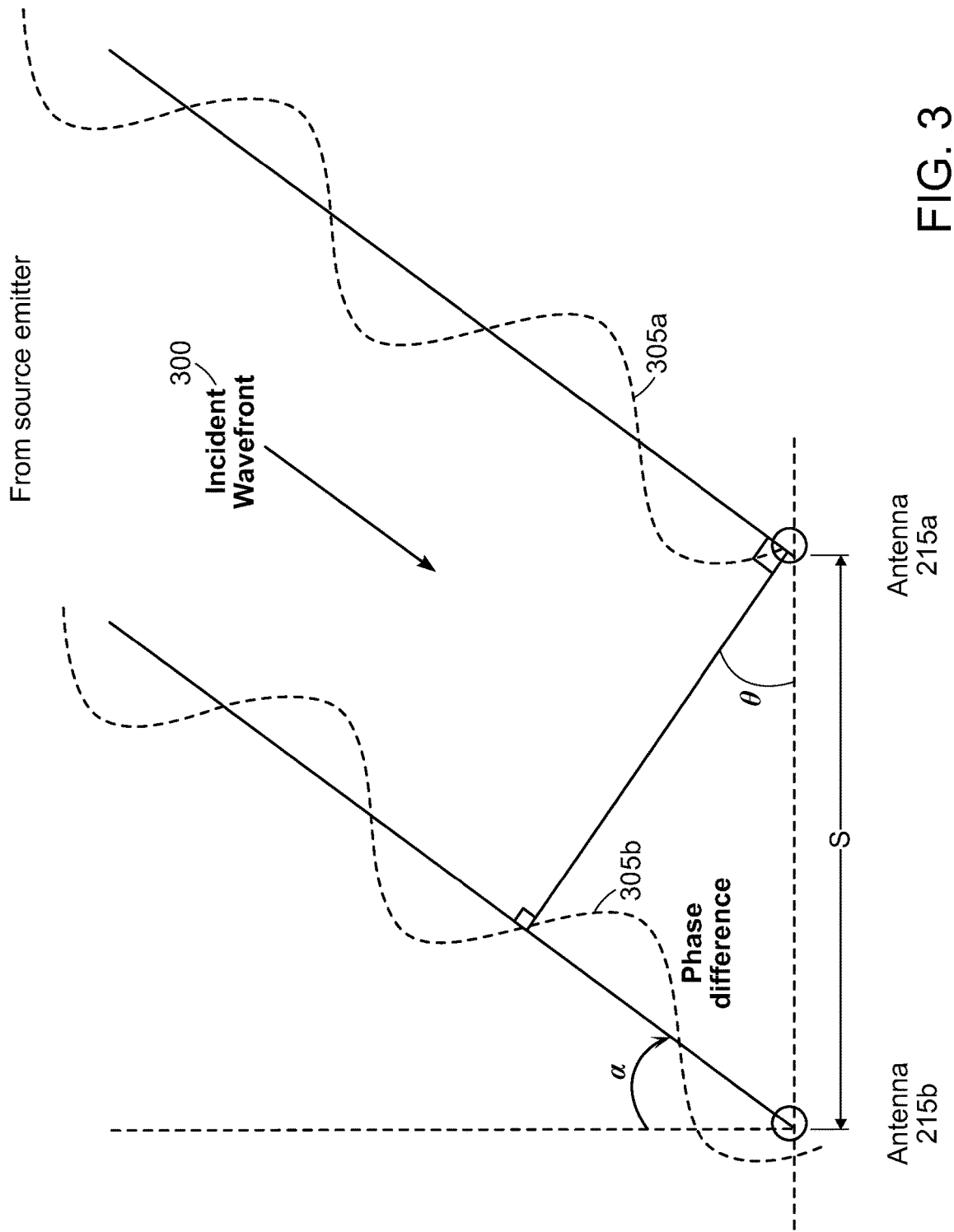
FIG. 3 is an illustration of a signal wavefront incident on an exemplary antenna pair.

FIG. 2 is a generalized functional block diagram of an exemplary direction finding system 200, comprising an antenna pair 220, a receiver 230, and one or more signal processor(s) 240 for providing a precision AoA estimate 205 of pulse signals 210 incident on antenna elements 215a, 215b of antenna pair 220. Signal processor(s) 240 may comprise a PI calculator 245, a TDOA calculator 250, and an AoA ambiguity resolver 255. The antenna elements 215a, 215b are separated by a distance s, which on typical existing aircraft, may be many meters. FIG. 3 illustrates the geometric relations among an incident RF signal wavefront 300 from a source emitter and received at the antenna elements 215a, 215b as a first signal component 305a and second signal component 305b. The path difference between the signal components 305a, 305b may be expressed as d=s*sin θ, where θ as shown comprise is the angle formed by a line drawn from the first antenna 215a normal to the signal path of the second signal component 305b. The time difference of arrival (TDOA) between the signal components 305a, 305b may be expressed as $$\Delta t = \frac{s * \sin\theta}{c},$$

where c is the speed of light. The phase difference of arrival may be given as $$\Delta\varphi = \frac{2\pi * s * \sin\theta}{\lambda}.$$

However the measured phase difference will be between 0 and $2\pi$, $$\Delta\varphi = \text{mod}\left(\frac{2\pi * s * \sin\theta}{\lambda}, 2\pi\right)$$

It is understood that TDOA and PI AoA measurements each contain uncertainty. With regard to TDOA error, the uncertainty is proportional to a time measurement error estimate associated with the measurement equipment, and may be empirically derived or may result from analysis of the equipment's design. The range of TDOA AoA solutions comprises a single solution plus or minus the associated error (which may have a Gaussian shape.) For example, the TDOA error is proportional to the baseline distance s and is roughly independent of pulse signal frequency, and may be expressed as $$\sigma_{\sin\theta} = \frac{c}{s} * \sigma_t.$$

The PI AoA solutions also contain an uncertainty due to phase measurement errors, which may be expressed by $$\sigma_{\sin\theta} = \frac{\lambda}{s}\left(\frac{\sigma_\varphi}{2\pi}\right).$$

However, the largest uncertainty of PI solutions is due to a modulo ($2\pi$) phase measurement error, which may be expressed by $$\Delta_{\sin\theta} = \frac{\lambda}{s}.$$

That is, the number of possibly correct AoA solutions resulting from PI direction finding techniques increases with signal carrier frequency (or goes inverse to signal wavelength) and increases with wider antenna baseline spacing. When s is wider than $$\frac{\lambda_{pulse}}{2},$$

the set of PI AoA estimates has approximately $$\frac{2s}{\lambda}$$

ambiguous results ("ambiguities") over the full hemisphere from −90° to 90° (or sin θ from −1 to 1). If any other technique allows the angles to be constrained to ±Δθ degrees; then the number of ambiguities can be reduced to $$\frac{2s}{\lambda}\frac{\Delta\theta}{90}.$$

Figure 4:
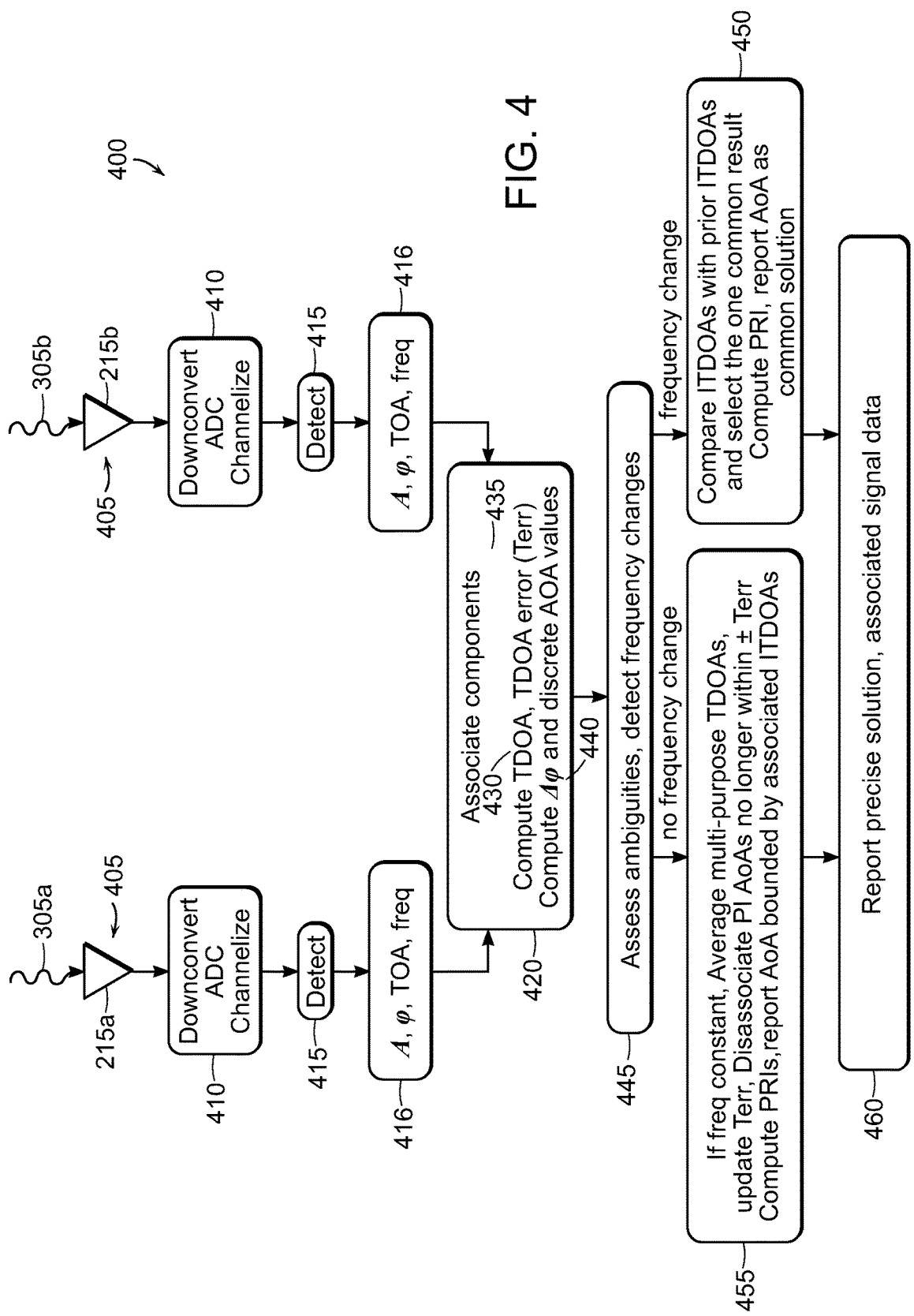
FIG. 4 is a flow diagram of an exemplary method for improved angle of arrival direction finding in accordance with an embodiment.

FIG. 4 is a flow diagram illustrating a method 400 of calculating the high precision AoA solution 205 (e.g., singular or a small set of values) in accordance with an embodiment. At step 405, the signal components 305a, 305b are received at the two antenna elements 215a, 215b. The antenna elements 215a, 215b feed two channel receivers 230 (as shown in FIG. 2; separate receivers may be used), which may down-convert (step 410), filter and digitize the signals with an analog-to-digital converter. Detected signals may be processed (step 415) to obtain signal features 416 of the respective signal components 305a, 305b, including phases φ, frequencies (expected to be the same for each incident pulse signal pair), times of arrival (TOA) and optionally peak amplitude A values. If TOA is utilized, then all TOAs must be reported on a common time reference for the two signal component channels. TDOA calculator 250 (shown in FIG. 2) can obtain the TDOA by cross-correlating or computing the cross ambiguity function of samples from the respective antennas. In step 420, The TDOA calculator 250 and PI calculator 245 may associate the two signal components through comparisons of their respective frequency and TOAs to result from the same emitter, and compute additional signal features, including the TDOA (Δt) 430, TDOA error 435 ("$T_{err}$" in FIG. 4), a phase difference (Δφ) 440, and the frequency of the associated signal components 305a, 305b. The TDOA may be measured using leading edge envelope detection for simple pulsed signals, and pre-detection correlation for phase and frequency modulated signals.

The AoA uncertainty for PI measurements will normally be much narrower than TDOA error ranges and appear as a set of near-discrete results. As graphically represented in FIGS. 5A and 5B, the TDOA calculator 250 and PI calculator 245 may use the computed Δφ and frequency information to generate a set of PI AoA estimates 500c-500e that may form a fine comb-like pattern and that fall within a range of TDOA AoA possibilities 505 (also referred to herein interchangeably as the TDOA AoA error boundary). This solution set (e.g., comprising a probability distribution function), computed for each received signal, enhances the ability to associate the received RF signals with the appropriate emitter(s). PI AoA ambiguities 500a, 500b, 500f and 500g do not fall within the TDOA AoA error boundary 505, and thus may be disassociated from the set of possibly correct high precision AoA solutions. The TDOA AoA error boundary 505 represents a coarse and continuous estimate of angles comprising the range of possible AoA solutions obtained by the TDOA direction finding operation. With reference again to FIG. 4, TDOA error 435 comprises the (measuring equipment related) error in the calculated TDOA 430 for a given AoA and determines the breadth of the TDOA AoA error boundary 505. Step 420 outputs TDOA 430 and the set (e.g., graphically, a comb-like combination) of all of the PI AoA ambiguities 500c-500e contained within TDOA error boundary 505.

In step 445, the TDOA AoA error boundary 505 and the bounded set of PI AoA ambiguities (500c-500e in the example) may be fed to AoA ambiguity bounder and multipulse combiner and resolver 255 (hereinafter, resolver 255), which will assess how many ambiguities are expected within the TDOA error boundary 505. If there is only one possible PI AoA result within the TDOA error boundary, the unique result is reported, or additional pulses/time segments may be analyzed to reduce error bounds of the aggregate AoA estimates from PI and TDOA.

If multiple PI AoA ambiguities fall within the TDOA error boundary 505, subsequent data having the same frequency and phase difference angle within user selected tolerances (or having the same frequency and AoAs being assumed to result from a common emitter) are analyzed by resolver 255. If no subsequent signal is received at same frequency, then analysis of signals at other frequencies is initiated. Subsequent signals from the same emitter but at a different frequency will still have the same true AoA. Analysis may be performed using computed AoAs or, for frequencies within a single octave, by dividing phase difference by the signal carrier frequency. In the latter case, signals whose frequency has changed will have a common ratio. Similarly, the precise AoA solution 205 may be determined either by comparison of bounded PI AoA ambiguities 500 computed from initial and additional/subsequent signals, or by narrowing the TDOA error boundary 505 through TDOA results averaging for successive signals, and thus consequentially also narrowing the solution set of PI AoA ambiguities.

Pulse repetition frequencies (PRFs) from typical emitters are on the order of $10^3$ to $10^5$ pulses per second. Embodiments of the disclosed methods may collect 1 to several hundreds of pulses, so acquisition times may be on the order of 10s to 100s of microseconds.

Signals at a lower carrier frequency may require many fewer pulses, leading to acquisition times on the order of 100s to 1000s of microseconds. By monitoring TDOA error 435 and PI AoA ambiguity (angular) spacing 510, the probability of selecting the correct emitter AoA solution may be increased.

Figure 6:
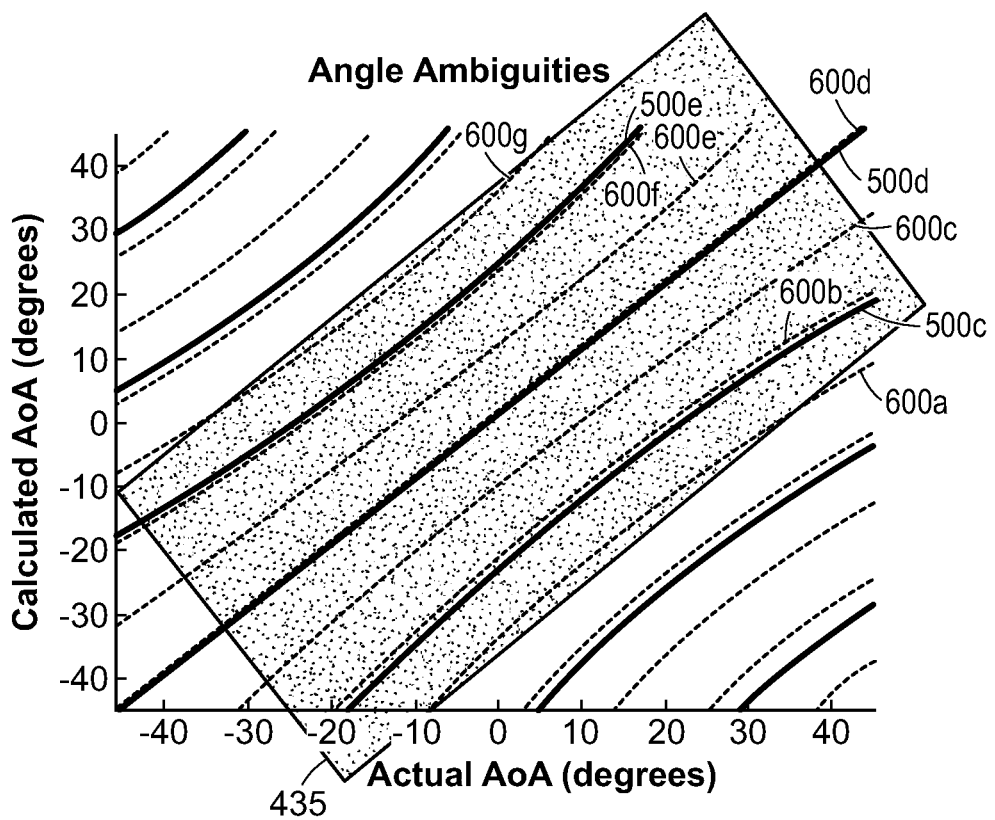
FIG. 6 is a graph illustrating exemplary PI AoA estimates for a first emitter frequency and changed estimates (with one in common) after the emitter changes frequency.

If the pulse-to-pulse frequency of received RF signals is determined to have changed, i.e., because the emitter comprises a FAE, the phase difference Δφ for a given AoA will also have changed. The AoA solutions at the second frequency will have one solution in common with the prior emissions detected from this emitter but the spacing of the ambiguities (which is S/lambda) will be different than signals detected earlier. This beneficially allows resolver 255 to rapidly compute the precise AoA solution 205. With additional reference to FIG. 6, in step 450, the set of PI AoA ambiguities 500c-500e (solid lines) associated with the first received pulse signal may be compared to PI AoA ambiguities 600a-600g (dotted lines) associated with an additional pulse signal. The PI AoA ambiguity common to both PI AoA solution sets (and within the TDOA AoA error boundary), which in the example are PI AoA estimates 500*d* and 600*d*, may then be immediately selected as the correct AoA solution 205 for the FAE. The comparison may involve a best match weighting of the fine comb teeth representing the PI AoA ambiguities. Thus, it can be appreciated how an emitter frequency change may enable immediate determination of the precise AoA 205 with a single additional signal pulse. In nearly all instances, the PI AoA estimates are measurably different (e.g., 500*c* to 600*c*). However, the PI AoA estimates 500*d* and 600*d* most likely to be the correct AoA solution 205 for the emitter may be identical (or may be negligibly offset) and represent a common solution to AoA at the emitter's distinct emission frequencies. This precise AoA solution 205, which may exhibit better than 0.1° of error, may then be output, with a computed pulse repetition interval (PRI), by the resolver 255. If the frequency change is more than an octave or if the error in measuring signal phase is very large then it may be the case that two or more AoAs are in common after a first change in frequency. If so, the AoAs of a subsequent pulse at yet another frequency will almost always result in only one common AoA for the ensemble of pulses. When only one AoA is in common with a set of received pulses, that AoA is correct and is reported.

Figure 7:
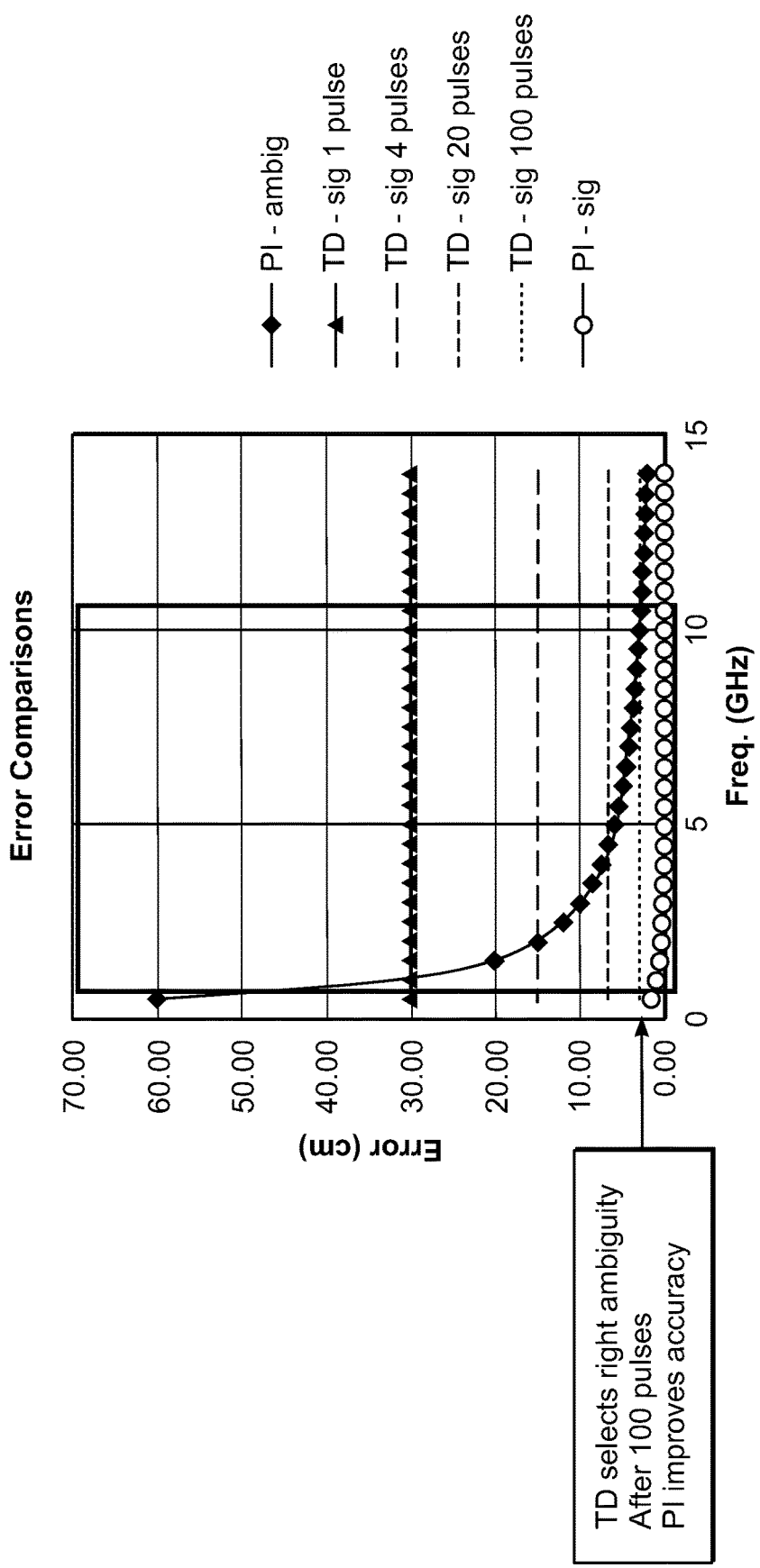
FIG. 7 is a graph illustrating exemplary improved AoA error range as a function of increased signal collection and analysis.

With reference again to FIG. 4, if the frequency remains constant between the first received RF pulse signal and the one or more subsequently incident additional pulse signals, the phase difference $\Delta\varphi$ between signals will not change over very short time scales (e.g. over hundreds or thousands of pulses). As noted above, at very low signal frequencies, it may be the case that only one PI AoA estimate falls within the TDOA error boundary 505. In such instances, that PI AOA was returned (in step 445) at as the correct AoA solution 205. It is more likely, however, that multiple PI AoA ambiguities (500*c*-500*e* in FIG. 5A) will fall within the initial TDOA range of possibilities (error boundary 505.) So, in step 455, the resolver 255 may iteratively, using the first received RF pulse signal and additional pulses as necessary) compute an average of the TDOAs and update the TDOA error 435 in order to narrow the TDOA error boundary 515.) The result of this process is graphically illustrated in FIG. 5B, wherein the averaging of TDOA information of additional pulse signals causes the updated TDOA error boundary 515 to have narrowed (in comparison to the initial error boundary 505 depicted in FIG. 5A). The enables the processor to disassociate PI AoA ambiguities 500*c* and 500*e* from the set of PI AoA ambiguities representing potentially the correct precise AoA 205 for the emitter. FIG. 7 illustrates the effect on exemplary TDOA and PI errors as a function of signal frequency of collected and analyzed additional pulse signals, wherein N additional pulses reduces the TDOA error in proportion to $\sqrt{N}$ samples (i.e., any mutually independent measurements that have a Gaussian distribution can be averaged to reduce the error standard deviation in this proportion.)

Figure 5:
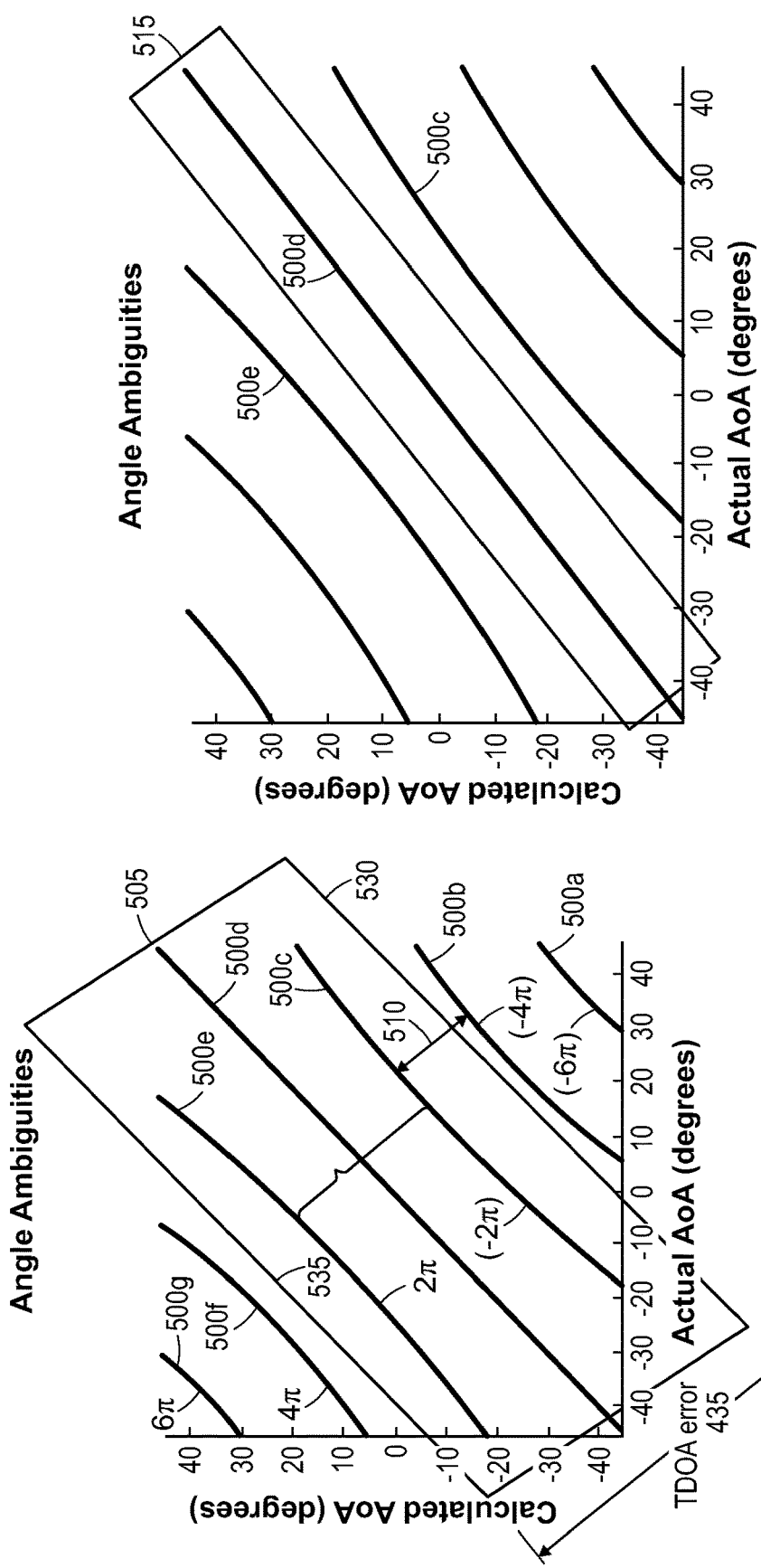
FIGS. 5A and 5B are graphs of exemplary AoA uncertainty ranges for TDOA and PI determined for an initial pulse and after averaging several pulses.

The narrowing of the TDOA AoA error boundary 515 (as shown in FIG. 5B) by averaging TDOA data for additional (e.g., collected over 10s to 100s of milliseconds) pulse signals may proceed iteratively, until there is preferably only one PI AoA estimate, e.g., ambiguity 500*d*, remaining, or until the few remaining PI AoA solutions have a probability of containing the precise AoA solution that meets or exceeds a predetermined probability threshold (if multiple AoA ambiguities remain, there will be very few.) Table One provides exemplary estimates of the number of pulses N as a function of pulse carrier frequency that might enable obtaining unambiguous AoA solutions for typical antenna spacing on current fighter airplanes.

| Pulse carrier frequency | # PI ambiguities in TDOA error boundary | Min. (N) for unambiguous solution |
| --- | --- | --- |
| 500 MHz | 1-2 | 1-4 |
| 1 GHz | 2-3 | 4-9 |
| 3 GHz | 6 | 36 |
| 9 GHz | 12 | 144 |
| 18 GHz | 24 | 596 |

As might be expected, higher frequency RF signals generate greater numbers of ambiguities. However, emitters of such higher frequency signals also tend to have higher pulse repetition rates, providing greater numbers of additional available pulse signals in a short interval for collection and analysis.

Optionally, prior to averaging the TDOA results from additional pulses, the TDOA AoA error boundary 505) may be narrowed at each boundary 530, 535 to the respective PI AoA ambiguities 500*c*, 500*e* nearest the respective boundary and within error boundary 505.

With reference again to FIG. 4, in step 460, once a singular unambiguous PI AoA solution, or a reduced set of PI AoA solutions 500 closest to the TDOA-based AoA solution has been obtained, resolver 255 of processor 240 may compute and report out the PRI(s) (if multiple emitters' AoA have been determined) along with the precision AoA solution 205 for the emitter(s).

Figure 8:
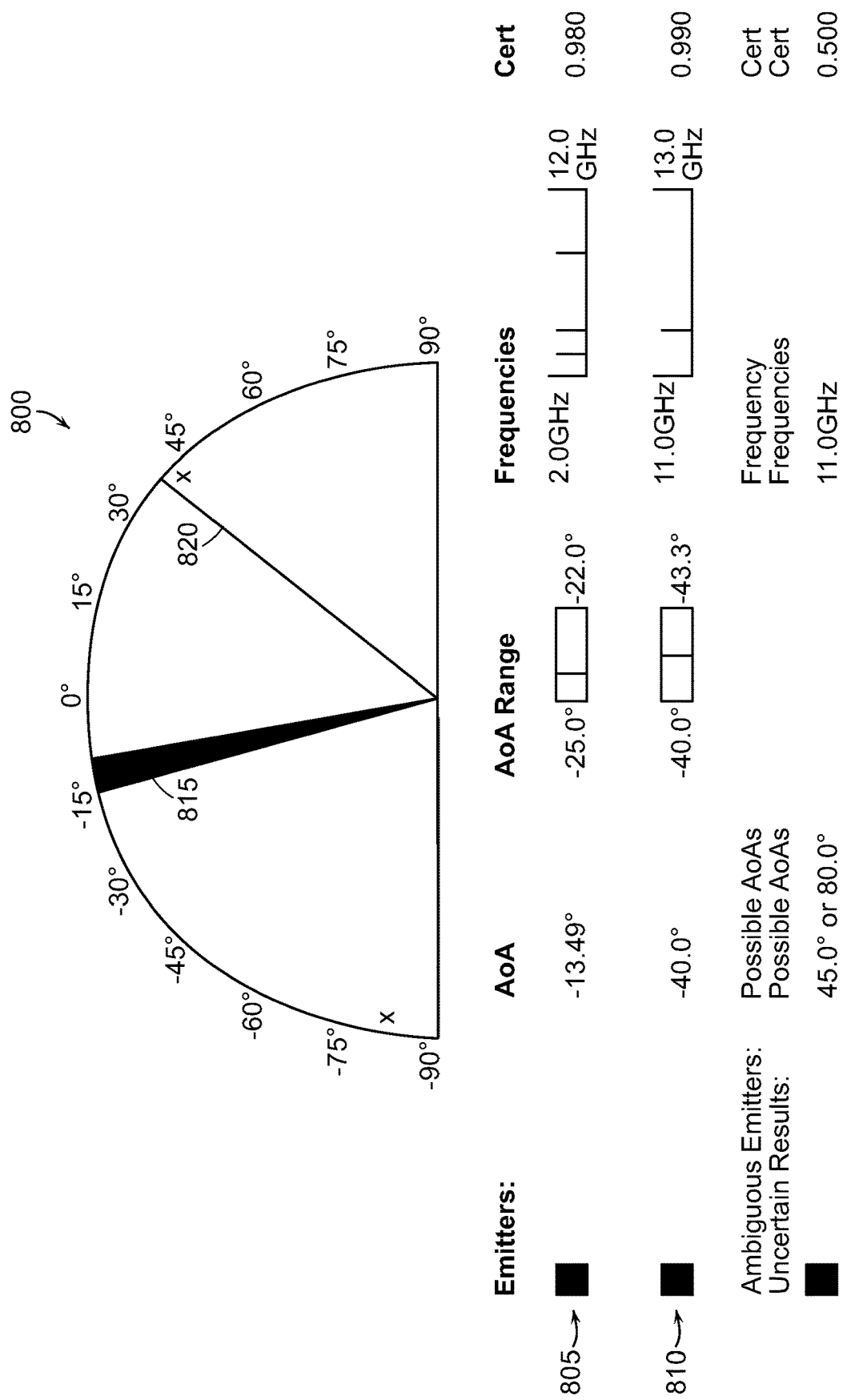
FIG. 8 is an exemplary graphical user interface displaying multiple sets of emitter data.

The systems described above improve AoA accuracy, enabling rapid response times particularly against higher frequency agile threats, using existing widely spaced antenna systems, Exemplary Architecture It will be apparent that signal processor 240 may, in whole or in part, be equivalently implemented in hardware, firmware, as one or more computer programs having computer-executable instructions or code running on one or more computers, or as any combination thereof. One or more users can interface with system 200 using any suitable display (e.g., televisions, computer monitors, laptops, tablets computing device, smart phones, personal digital assistant (PDAs) and/or other displays and computing devices, etc.) In some embodiments, system 200 and the user(s) of the system may be co-located on an aircraft. Of course, users may also be located remotely from system 240. An exemplary user interface 800 is illustrated in FIG. 8. User interface 800 may provide information for display, such as real-time display of multiple emitter data 805, 810 and AoA plots 815, 820.

In certain embodiments, the antenna elements 215*a*, 215*b* may comprise directional antennas having known gain patterns that are configured to point in different directions. Amplitude comparison direction finding techniques may be employed, in addition to TDOA and PI direction finding techniques, to further adjust the TDOA error boundary pulse signals. Amplitude comparison techniques produce similar AoA results and error ranges as TDOA techniques. Amplitude techniques may thus be used in place of TDOA, or amplitude and TDOA estimates may be computed for each pulse and their average AoA used instead of the TDOA result.

Although the above disclosure discusses what is currently considered to be a variety of useful examples, one skilled in the art will realize the invention may be embodied in other specific forms without departing from the spirit or essential characteristics thereof. The foregoing embodiments are therefore to be considered in all respects illustrative rather than limiting of the inventions described herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for determining an angle of arrival (AoA) of one or more RF signals received from an emitter at an antenna pair, comprising:
    receiving at a processor corresponding first and second components of a first signal detected at first and second antenna elements of the antenna pair, the antenna elements spaced apart by more than one half wavelength of the received signal components;
    determining one or more features of the received signal, including a phase difference between corresponding phases of the first and second signal components detected at the first and second antenna elements, and a time difference of arrival (TDOA) between the signal components arriving at the first and second antenna elements, the TDOA having a known measurement uncertainty or error range;
    performing a TDOA angle calculation using the TDOA to obtain a TDOA error boundary comprising a range of TDOA AoA possibilities centered at a solution to the TDOA angle calculation and bounded by the known TDOA measurement error range;
    calculating a set of AoA estimates using phase interferometry (PI) based on the phase difference of the first and second signal components measured at the first and second antenna elements, and within the TDOA AoA error boundary; and
    determining a precise AoA estimate by iteratively performing the steps of receiving signal components at the first and second antenna elements, determining the received signal component features, averaging the TDOA measurements, using the averaged TDOA measurements to re-compute the TDOA AoA error boundary with smaller error bounds, and, optionally, averaging the signal component phase differences and re-calculating the PI AoA estimate for one or more additional signals associated with the emitter.

2. The method of claim 1, further comprising:
    if the set of PI AoA estimates contains only one AoA estimate within the TDOA AoA error boundary, reporting that AoA estimate as the precise AoA estimate.

3. The method of claim 1, further comprising reporting as the precise AoA estimate the PI AoA estimates remaining within the TDOA AoA error boundary.

4. The method of claim 3, further comprising:
    calculating a probability weight for each remaining PI AoA estimate; and
    reporting the calculated probability weights associated with the PI AoA estimates.

5. The method of claim 1, wherein determining the precise AoA estimate further comprises:
    determining whether a frequency of the one or more additional signals associated with the emitter differs from a frequency of the first signal;
    if the frequency of the one or more additional signals differs from the frequency of the first signal, reporting as the precise AoA estimate the common PI AoA estimate associated with the first signal and the one or more additional signals within the TDOA AoA error boundary; and
    if the frequency of the one or more additional signals does not differ from the frequency of the first signal, disassociating PI AoA estimates no longer within the TDOA AoA error boundary with smaller error bounds, until the set of PI AoA estimates has been reduced such that a probability of the PI AoA estimates remaining in the set being the correct AoA achieves a predetermined threshold, and reporting the acceptably reduced set of PI AoA estimates.

6. The method of claim 1, wherein prior to averaging the TDOA measurements, the initial TDOA AoA error boundary is reduced to extend only across the angles spanned by the PI AoA estimates included within the TDOA AoA error boundary.

7. The method of claim 5, further comprising, if the frequency of the one or more additional signals does not differ from the frequency of the detected first signal, monitoring the TDOA measurement error and spacing of the PI AoA estimates to determine when a sufficient number of additional signals have been collected to achieve the predetermined probability threshold.

8. The method of claim 5, wherein additional signals are collected for tens of microseconds to milliseconds.

9. The method of claim 1, wherein the first signal and one or more additional signals are pulsed signals.

10. The method of claim 1, wherein:
    the first and second antenna elements comprise directional antennas having known gain patterns and have peak gain in different directions; and
    adjusting the TDOA AoA error boundary based on an amplitude comparison calculation using the first and second signal components of the first signal and the one or more additional signals.

11. A system for determining an angle of arrival (AoA) of one or more RF signals received from an RF emitter at an antenna pair, comprising:
    an antenna pair for detecting first and second components of a first signal at corresponding first and second antenna elements spaced apart by more than one half wavelength of the detected first signal;
    one or more signal processors in communication with the antenna pair to receive the first and second components, and configured to:
        determine one or more features of the received signal, including a phase difference between corresponding phases of the first and second signal components detected at the first and second antenna elements, and a time difference of arrival (TDOA) between the signal components arriving at the first and second antenna elements, the TDOA having a known measurement uncertainty or error range;
        perform a TDOA angle calculation using the TDOA to obtain a TDOA AoA error boundary centered at a solution to the TDOA angle calculation and bounded by the known TDOA measurement error range;
        calculate a set of AoA estimates using phase interferometry (PI) based on the phase difference of the first and second signal components measured at the first and second antenna elements, and within the TDOA AoA error boundary; and determine a precise AoA estimate by iteratively performing the steps of receiving signal components at the first and second antenna elements, determining the received signal component features, averaging the TDOA measurements, using the averaged TDOA measurements to re-compute the TDOA AoA error boundary with smaller error bounds, and, optionally, averaging the signal component phase differences and re-calculating the PI AoA estimate for one or more additional signals associated with the emitter.

12. The system of claim 11, wherein the one or more processor is further configured to report as the precise AoA estimate the PI AoA estimates remaining within the TDOA AoA error boundary.

13. The system of claim 12, wherein the one or more processors is further configured to:
calculate a probability weight for each remaining PI AoA estimate; and
report the calculated probability weights associated with the PI AoA estimate(s).

14. The system of claim 11, wherein the one or more processor is further configured, if the set of PI AoA estimates contains only one AoA estimate, report that AoA estimate as the precise AoA estimate.

15. The system of claim 11, wherein the one or more processors is further configured to determine the precise AoA estimate by
determining whether a frequency of the one or more additional signals associated with the emitter differs from a frequency of the first signal;
if the frequency of the one or more additional signals differs from the frequency of the first signal, reporting as the precise AoA estimate the PI AoA estimate associated with the first signal and the one or more additional signals; and
if the frequency of the one or more additional signals does not differ from the frequency of the first signal, disassociating PI AoA estimates no longer within the TDOA AoA error boundary with smaller error bounds, until the set of PI AoA estimates has been reduced such that a probability of the PI AoA estimates remaining in the set being the correct AoA achieves a predetermined threshold, and reporting the acceptably reduced set of PI AoA estimates.

16. The system of claim 11, wherein the one or more processors is further configured to, prior to averaging the TDOA measurements, reduce the initial TDOA AoA error boundary to extend only across the angles spanned by the PI AoA estimates included within the TDOA AoA error boundary.

17. The system of claim 11, wherein the one or more processors is further configured to, if the frequency of the one or more additional signals does not differ from the frequency of the detected first signal, monitor the TDOA measurement error and spacing of the PI AoA estimates to determine when a sufficient number of additional signals have been collected to achieve the predetermined probability threshold.

18. The system of claim 11, wherein:
the first and second antenna elements comprise directional antennas having known gain patterns and peak gain in different directions; and
the one or more processors is further configured to adjust the TDOA AoA error boundary based on an amplitude comparison calculation using the first and second signal components of the first signal and the one or more additional signals.

19. The system of claim 11, further comprising an electronic support and radar warning receiver.

20. The system of claim 11, wherein the antenna array and the one or more processors are installed on a moving platform.

21. A non-transient computer readable medium comprising program instructions, the program instructions when executed by one or more processors comprise instructions for:
receiving at the one or more processors corresponding first and second components of a first signal detected at first and second antenna elements of an antenna pair, the antenna elements spaced apart by more than one half wavelength of the received signal components;
determining one or more features of the received signal, including a phase difference between corresponding phases of the first and second signal components detected at the first and second antenna elements, and a time difference of arrival (TDOA) between the signal components arriving at the first and second antenna elements, the TDOA having a known measurement uncertainty or error range;
performing a TDOA angle calculation using the TDOA to obtain a TDOA AoA error boundary centered at a solution to the TDOA angle calculation and bounded by the known TDOA measurement error range;
calculating a set of AoA estimates using phase interferometry (PI) based on the phase difference of the first and second signal components measured at the first and second antenna elements, and within the TDOA AoA error boundary; and
determining a precise AoA estimate by iteratively performing the steps of receiving signal components at the first and second antenna elements, determining the received signal component features, averaging the TDOA measurements, using the averaged TDOA measurements to re-compute the TDOA AoA error boundary with smaller error bounds, and, optionally, averaging the signal component phase differences and re-calculating the PI AoA estimate for one or more additional signals associated with the emitter.

* * * * *